J. W. & A. RUGER.
Cracker-Machine.
No. 165,875. Patented July 20, 1875.
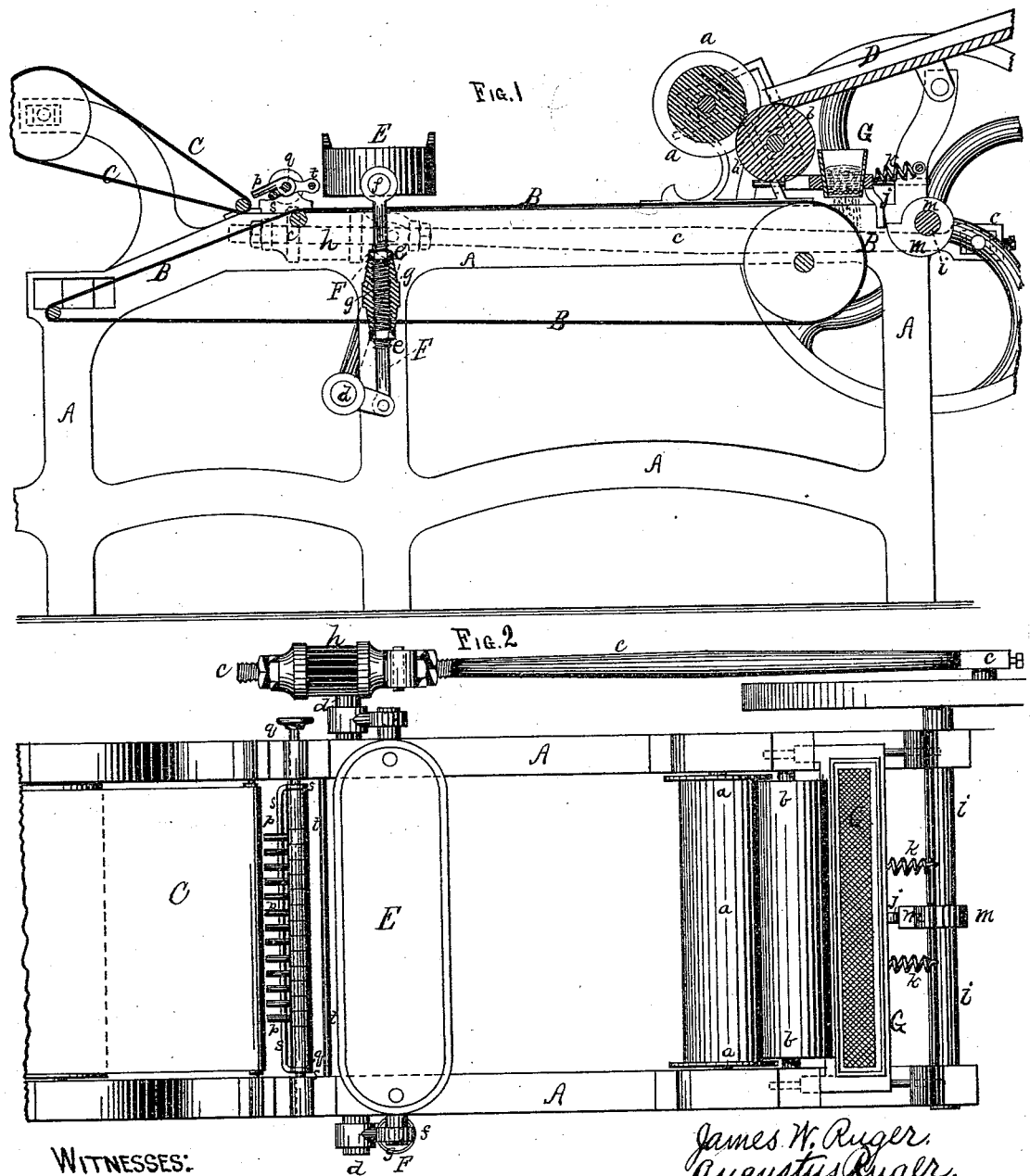

UNITED STATES PATENT OFFICE.

JAMES W. RUGER AND AUGUSTUS RUGER, OF BUFFALO, NEW YORK.

IMPROVEMENT IN CRACKER-MACHINES.

Specification forming part of Letters Patent No. 165,875, dated July 20, 1875; application filed December 24, 1874.

*To all whom it may concern:*

Be it known that we, JAMES WALLACE RUGER and AUGUSTUS RUGER, both of Buffalo, in the county of Erie and State of New York, comprising the firm of J. W. Ruger & Co., have made certain Improvements in Cracker-Cutting Machines, of which the following is a specification:

This invention relates to certain improvements in operating the cutters, and the flouring mechanism of that class of machines for cutting crackers, biscuits, &c., in which a vertically-reciprocating cutter is brought down at intervals upon the dough, which is carried in a sheet beneath the same by means of a traveling apron.

Our invention consists, first, in a certain new combination of parts for adjusting and operating the cutters of such machines, consisting, essentially, of an elastic attachment to the piston or crank rod, for operating and adjusting one side of the cutting-frame, in combination with an adjustable strap for operating and adjusting the other side of said frame, as fully hereinafter described; second, in a flouring-hopper provided with a lug and spring, in combination with a cam and rotating shaft, for the purpose of agitating and shifting said flouring-hopper, so as to dust the flour upon the belt or apron, as hereinafter fully described.

In the drawings, Figure 1 is a side elevation, and Fig. 2 a plan.

A represents the metal frame of the machine; B, the endless apron moving on appropriate rollers; C, a short slanting apron which carries off the "scrap;" and D, the feed-board where the dough is first fed onto the apron B through rollers $a\ b$. E is the frame to which the cutters, of any different shapes or sizes, are attached, and which cut down through the dough sheet as it is carried along by the apron B.

This cutter-frame is worked up and down on one side by the spring connecting-rod $c$, which actuates a crank-shaft, $d$, running underneath and across the machine.

To the other end of this crank-shaft is attached an adjustable strap, F, its other end pivoted to that side of the cutter-frame E, as shown at $f$, Fig. 1. This strap is composed of five parts, the two end pieces being a right and left screw, respectively, and working into a corresponding nut, $g$, with a jam-nut, $e$, each side, to keep it from working loose either way.

This is an important feature of my invention, as, when it is required to cut deeper into the dough sheet, the nut $h$ on the connecting-rod $c$ is shortened up, which accomplishes the purpose so far as that side is concerned; but without this adjustable strap F on the other side, it would not cut evenly across the whole sheet, and which we now accomplish by screwing up or unscrewing the nut $g$ on said strap.

Another important feature in our machine is the flouring box or hopper G, arranged on the machine under the feed-board D, just back of the rollers $a\ b$, and given a vibrating or reciprocating movement, sufficient to sift the flour therein through the wire or bolting bottom, by means of a cam, $m$, on the operating-shaft $i$, which strikes a lug, $j$, attached to the hopper G, as shown in both figures of the drawings. This agitates or sifts the flour through onto the apron B beneath, so that when the dough sheet is delivered thereon it does not stick. This is a considerable saving of time and labor, as it is usual to flour the apron by hand. The hopper is returned to its place, after every contact of the cam $m$, by means of a spring or springs, $k\ k$.

Another important device is our finger-lifter. The loose fingers or separators $p\ p\ p$ on shaft $q$ are in common use, but hitherto there has been no device to raise the fingers. The object of these fingers is to separate the crackers from the "scrap" as they pass underneath, and they are each set on the shaft $q$ independently, to accommodate them to different sizes of crackers. It is customary to raise these fingers, one or more at a time, by hand; but in consequence of the clogging of the cutters, or when a new form is put in, it becomes necessary to raise them quickly, and all at once, which cannot be done by hand. We therefore arrange a swinging finger-bar, $s$, underneath the fingers, out of the way of what passes underneath, operated by any suitable device outside, to raise them simultaneously, or drop them all at once. As they are thrown up they all rest against a rod, $t$, attached back of the shaft $q$.

We claim—

1. In a machine for cutting crackers, the combination of the elastic attachment of the connecting-rod $c$, the crank-shaft $d$, adjustable strap F, and cutting-frame E, all substantially as and for the object specified.

2. In a machine for cutting crackers, the flouring-hopper G, having the lug $j$, in combination with the cam $m$, shaft $i$, and springs $k$, substantially as and for the purpose described.

3. In a cracker-cutting machine, in combination with the fingers $p\ p\ p$, the swinging bar $s$, for raising and lowering said fingers simultaneously, as and for the purpose specified.

In witness whereof, we have hereunto signed our names in the presence of two subscribing witnesses.

J. W. RUGER.
AUGUSTUS RUGER.

Witnesses:
J. R. DRAKE,
T. H. PARSONS.